2,937,927

PRODUCTION OF RED OXIDE OF IRON PIGMENTS

Joseph W. Ayers, Easton, Pa., assignor to C. K. Williams & Co., East St. Louis, Ill., a corporation of Delaware No Drawing. Filed Nov. 13, 1956, Ser. No. 621,521

4 Claims. (Cl. 23—200)

This invention relates to the production of red oxide of iron pigments from iron salt solutions in which oxygen is introduced into heated aqueous, iron salt solution containing metallic iron and an appropriate colloidal hydrous iron oxide seed.

A number of processes involving this general procedure are disclosed in the patent literature as in the Marsh Patent No. 2,716,595, the Toxby Patent No. 2,620,261, the Marsh reissue Patent No. 24,173 and in the Bennetch Patent No. 2,785,991. An examination of these patents reveals that for obtaining the precipitated iron oxides of the desired color and other qualities, they have been directed particularly to the problem of producing a satisfactory or better red oxide-producing seed. The production of iron oxide pigment particles of various shades from light red to deep maroon by growing the same upon the properly prepared seed, was apparently not recognized as involving any particular problem, and each of the patentees disclosed the same general procedures. Although the processes as disclosed can be controlled in successive operations or batches to produce the desired shade, the quality of the pigments produced therefrom is either inferior or it varies excessively and makes standardization for commercial acceptance difficult.

It is the object of the instant invention to provide a process of the above character which provides in batch after batch complete control of the color purity and color brightness as well as chroma within acceptable commecial limits.

Broadly stated, the invention primarily involves a novel specific control of the acidity of the aqueous ferrous salt solution containing the metallic iron and the red oxide-producing, colloidal, ferric oxide seed during the oxidation reaction which grows the red ferric oxide particles upon the seed, to the desired pigment size and shade. The acidity of said solution is maintained, as far as is practicable, at a substantially constant level within the range pH value of 3 to 4.5, inclusive, during substantially the whole period of said oxidation treatment. Any deviation from these conditions outside of said range, leads to inferior quality. The specific methods of controlling the acidity hereinafter disclosed are capable of maintaining the reaction mass at a level of acidity varying not more than plus or minus two tenths in pH value. Any method used must be capable of avoiding more than short periods of deviation from these conditions of acidity. Acidities below a pH value of 3 should be completely or continuously avoided, for the color qualities obtainable decline sharply below this level of acidity.

In one embodiment, the control of the acidity involves the substantially constant feeding of metallic iron to the iron salt solution containing the seed during the oxidation operations at a rate which replaces the amount of surface area of iron as the same is consumed. The amount of the metallic iron and iron salt initially incorporated in the reaction mass must, of course, have been correlated to provide an acidity within the stated critical range.

Since the metallic iron most desirably used in commercial operations is thin sheet steel cuttings and scrap having a large but variable surface area per unit of volume or weight, there is no satisfactory way of predetermining the proper proportions of iron to iron salt to obtain the required acidity conditions for the iron oxide producing reaction mass. Trial and error following laboratory testing can supply the information required for initial establishment of proper acidity. During feeding of the scrap metal into the reaction vessel as the metal is consumed, periodic checking of pH value of the solution will indicate the necessity for any change of feeding rate.

In a prefered procedure under this first embodiment, the replacement of the iron being consumed can be automatically controlled over substantial periods by conducting the reaction in a vessel equipped to permit gravity feed of a column of scrap iron into the solution as the bottom or supporting part thereof is eroded away by the action of the acid formed in the reaction mass.

The control of acidity within the required pH value range, constituting the second embodiment, is accomplished by incorporating in the reaction mass containing the iron with the iron salt and the red oxide-producing seed, a suitable buffering agent, examples of which are the acetates, borates and phosphates of sodium or other alkali metal, each of which can maintain the pH value constant and between about 3 and 4.5. The acids corresponding to said salts may alternatively be used. In this process the whole quantity of scrap iron required may be added in the beginning, or it may be added in increments adequate to maintain a desirable rate of reaction.

The method by which the red oxide-producing seed used is formed is not part of the present invention, for such seeds may be produced by any of the known processes, as those described in the hereinbefore mentioned patents. One suitable process involves mixing copperas or other ferrous salt in aqueous solution with sodium hydroxide or other alkali in substantially equivalent proportions, and agitating the mass in the presence of air or oxygen at room temperature until the salt is converted into ferric oxide, the same being in colloidal form.

For producing the red iron oxide particles of high quality pigment grade, under the present invention, the reaction solution containing the seed may be further processed, if desired, in the same vessel. If the solution is alkaline or at a hydrogen ion concentration above pH 4.5, additional copperas or other iron salt as crystals or in aqueous solution may be added. Under the one embodiment, metallic iron is added in a proportion estimated to provide a hydrogen ion concentration definitely within the pH value range of 3 and 4.5 and preferably at about 3.65. Under the other embodiment, metallic iron and a buffering agent capable of establishing and maintaining said conditions of acidity is added to the solution.

Formation of the red iron oxide particles of pigment size and shade is then accomplished by oxidation at elevated temperatures suitably at from 50° to 100° C. during agitation. The contact between the reactants, and hence the reaction, may be efficiently accomplished by suspending the iron cuttings in a loose mass in the solution and circulating the solution continuously therethrough, the solution being maintained within the required pH value range. Air or oxygen may be bubbled through the hot solution until the desired shade of red iron oxide is obtained, the lighted shades being obtained first and the deeper shades, ultimately deep maroon or purple, being formed as the process continues. If the slurry formed thickens and causes the reaction to slow up excessively, the slurry may be diluted with water and with additional reactants in quantities maintaining the required reaction condition.

Other salts utilizable in the process are ferrous chloride and acetate or mixtures thereof. Other alkalies utilizable are the other alkali metal hydroxides including ammonium hydroxide and soda ash, and less advantageously alkalies such as calcium hydroxide.

*Example 1*

An aqueous ferrous sulfate solution containing colloidal iron oxide seed of the character required for producing precipitated iron oxide pigments was prepared in known manner by blowing air through an aqueous solution of ferrous sulfate to which sodium hydroxide solution had been added, the quantities being $FeSO_4$, 13 kgs., and NaOH, 5.3 kgs., the total of the aqueous solutions being 208.4 liters and the temperature being maintained between about 63° and 78° F.

A portion of the seed-containing solution amounting to 18 gallons was transferred to a reactor containing a center well through which the solution could be circulated and in which there was a column of soft black iron scrap having a calculated surface area of 1566 sq. in., the column extending above the top of the solution. The solution was heated and maintained at 185°–190° F. during the introduction of air (6 in.) and continuously circulated over the submerged part of the iron, this action being continued for 200 hours. The pH value of the solution during the initial oxidation action was 3.5 due to the excess of ferrous sulfate present. As the oxidation progressed with consumption of the submerged iron, the column sank and replaced the consumed iron, thus maintaining the quantity of iron substantially constant to take up the sulfuric acid formed during the reaction. Periodic tests of the acidity revealed that the pH value was substantially constant, varying only from about 3.2 to 3.5 (3.34 was average of readings). A sample of the product taken after 125 hours provided a light red pigment. A bright medium shade red pigment was obtained from the final solution.

*Example 2*

Another portion of the seed-containing solution of the same volume was treated as described in Example 1 with the exception that the acidity was controlled in a different way, i.e., by introducing 100 ml. of acetic acid into the solution, which acted as a buffering agent. In this embodiment, the iron was introduced into the well and all submerged at the beginning of the oxidation treatment.

The pH value of the solution varied within the range of from 3.9 to 5.2, most of the readings being between 4.25 to 4.7 (4.44 was average of readings) during the oxidation treatment controlled at 187° F. while air (6 in.) was introduced, the operation being continued 140 hours. At 98 hours oxidation, a sample of light red oxide was obtained, and the shade darkened as the process continued, the end product being a bright red oxide of medium shade.

*Example 3*

A colloidal iron oxide seed was prepared by introducing 693 grams of ferrous sulfate (as copperas) dissolved in water (diluted to 5:1) into 365 grams (an equivalent amount) of sodium hydroxide dissolved in water (diluted to 5:1), and after adding 5 liters of additional water, introducing air during stirring until oxidation of the ferrous content had been completed.

The solution containing the colloidal seed thus produced was then transferred to a reaction tank containing soft black iron scrap in an amount providing about 87 sq. in. of surface area per gallon of solution. Heat was then applied and 150 grams of ferrous sulfate was added thereby imparting acidity to the solution testing 3.65 in pH value. The solution was heated to and maintained at about 185° F. while air was being introduced. As the iron was consumed, additional increments were added periodically to maintain the acidity at an average pH value of 3.75 and always between about 3.25 and 4.5. After 161 hours of treatment, a light red oxide was obtained, and after 209 hours a darker shade, the operation being then discontinued. The total amount of scrap added was 450 sq. in./gal.

*Example 4*

A colloidal ferric oxide seed was prepared as described in Example 3 with the change that the amount of sodium hydroxide used was 383 grams. This seed was then further treated as described in said example with the changes that the supplement of ferrous sulfate amounted to 220 grams, the temperature was maintained at 175° F. and the heating and oxidizing was continued for only 163 hours to produce a light red iron oxide. In this run, the acidity initially established during the oxidation was of 2.9 pH value and the scrap iron was added at a rate which maintained the solution at a pH value averaging 3.3 and always between about 2.9 and 3.5. The total scrap iron necessary to maintain this control was 450 sq. in./gal.

It should be understood that the present invention is not limited to the specific details disclosed herein as to materials, procedures or reaction conditions, but that it extends to all equivalents which will occur to those skilled in the art upon consideration of the general teachings herein and the scope of the claims appended hereto.

I claim:

1. In the production of red oxide of iron pigment involving the growth of crystals of the same upon colloidal ferric oxide seed effected by introducing oxygen during a period of many hours into an aqueous solution of a ferrous salt containing metallic iron and said seed while the solution is being heated and agitated, the improvement whereby pigment of uniformly high purity and color brightness can be repeatedly obtained which comprises, maintaining the acidity of said aqueous solution within a pH value of 3 and 4.5 during substantially the whole period of said oxidation.

2. In the production of red oxide of iron pigment involving the growth of crystals of the same upon colloidal ferric oxide seed effected by introducing oxygen during a period of many hours into an aqueous solution of a ferrous salt containing metallic iron and said seed while the solution is being heated and agitated, the improvement whereby pigment of uniformly high purity and color brightness can be repeatedly obtained which comprises, adjusting the amount of metallic iron and iron salt present in the solution to that which provides an acidity within the pH range of 3 and 4.5 when the oxidation is commenced and maintaining the acidity of said aqueous solution within the pH range of 3 and 4.5 during substantially the whole period of said oxidation by constantly feeding additional metallic iron into the solution in a quantity which replaces the surface area of the iron consumed.

3. In the production of red oxide of iron pigment involving the growth of crystals of the same upon colloidal ferric oxide seed effected by introducing oxygen during a period of many hours into an aqueous solution of a ferrous salt containing metallic iron and said seed while the solution is being heated and agitated, the improvement whereby pigment of uniformly high purity and color brightness can be repeatedly obtained which comprises, maintaining the acidity of said aqueous solution within a pH value of 3 and 4.5 during substantially the whole period of said oxidation by adding to said solution a buffering agent having such quality.

4. In the production of red oxide of iron pigment involving the growth of crystals of the same upon colloidal ferric oxide seed effected by introducing oxygen during a period of many hours into an aqueous solution of a ferrous salt containing metallic iron and said seed while the solution is being heated and agitated, the improvement whereby pigment of uniformly high purity and color brightness can be repeatedly obtained which comprises, maintaining the acidity of said aqueous solution at a pH value continuously above 3 and below 4.5 during substantially the whole period of said oxidation.

References Cited in the file of this patent

UNITED STATES PATENTS

| | | |
|---|---|---|
| Re. 24,173 | Marsh | July 3, 1956 |
| 2,111,727 | Plews | Mar. 22, 1938 |
| 2,388,659 | Ryan | Nov. 6, 1945 |
| 2,716,595 | Marsh | Aug. 30, 1955 |
| 2,785,991 | Bennetch | Mar. 19, 1957 |